United States Patent
Palazzolo

(10) Patent No.: US 9,441,726 B1
(45) Date of Patent: Sep. 13, 2016

(54) TRANSFER CASE LUBRICATION SYSTEM WITH PUMP CONTROL

(71) Applicant: BorgWarner Inc., Auburn Hills, MI (US)

(72) Inventor: Michael Palazzolo, Madison Heights, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/868,692

(22) Filed: Sep. 29, 2015

(51) Int. Cl.
*F16H 57/04* (2010.01)
*F04C 2/10* (2006.01)
*B60K 23/08* (2006.01)

(52) U.S. Cl.
CPC ....... *F16H 57/0436* (2013.01); *B60K 23/0808* (2013.01); *F04C 2/10* (2013.01); *F16H 57/045* (2013.01); *F16H 57/0435* (2013.01)

(58) Field of Classification Search
CPC ........... F16H 57/0436; F16H 57/0435; F16H 57/045; F04C 2/10; F16D 13/74; B60K 17/344; B60K 23/0808
See application file for complete search history.

(56) References Cited

U.S. PATENT DOCUMENTS

| | | | | |
|---|---|---|---|---|
| 5,115,887 A * | 5/1992 | Smith | ............... | F16H 57/0447 184/6.12 |
| 5,492,194 A * | 2/1996 | McGinn | ............... | B60K 17/344 180/233 |
| 5,788,038 A * | 8/1998 | Hickey | ............... | B60K 23/00 192/85.16 |
| 5,819,192 A * | 10/1998 | Wakahara | ............... | B60K 23/0808 180/247 |
| 5,916,051 A * | 6/1999 | Schleuder | ............... | B60K 17/344 475/138 |
| 6,161,643 A * | 12/2000 | Bober | ............... | B60K 17/20 180/197 |
| 6,330,928 B1 * | 12/2001 | Sekiya | ............... | B60K 17/3505 180/197 |
| 6,679,799 B2 * | 1/2004 | Bowen | ............... | B60K 6/365 180/65.25 |
| 6,948,604 B2 * | 9/2005 | Puiu | ............... | B60K 17/344 180/249 |
| 6,997,299 B2 * | 2/2006 | Brissenden | ............... | B60K 23/0808 180/248 |
| 7,004,873 B2 * | 2/2006 | Puiu | ............... | B60K 17/3462 475/145 |
| 7,059,462 B2 * | 6/2006 | Brissenden | ............... | B60K 23/0808 180/248 |
| 7,648,118 B2 * | 1/2010 | Ukpai | ............... | F16H 57/0447 251/11 |
| 7,743,888 B2 * | 6/2010 | Allen | ............... | F16H 57/0434 180/223 |
| 8,696,326 B2 * | 4/2014 | Hadar | ............... | F04B 17/03 417/310 |
| 8,776,950 B2 | 7/2014 | Quehenberger et al. | | |
| 2005/0160728 A1 * | 7/2005 | Puiu | ............... | B60K 17/3462 60/435 |
| 2014/0094333 A1 * | 4/2014 | Ebner | ............... | F16H 57/05 474/91 |
| 2015/0377260 A1 * | 12/2015 | Besemer | ............... | F15B 11/162 60/430 |

* cited by examiner

*Primary Examiner* — Paul N Dickson
*Assistant Examiner* — Timothy Wilhelm
(74) *Attorney, Agent, or Firm* — Young Basile Hanlon & MacFarlane P.C.

(57) ABSTRACT

A lubrication system (300, 400) for a transfer case (200) includes a pump (240) in fluid communication with a lubricant source (243) and a power transfer assembly as well as a valve (302, 402) positioned along a fluid flow path between the lubricant source (243) and the power transfer assembly. The valve (302, 402) includes a valve inlet (306), a first valve inlet (406), a first valve outlet (308, 408) that does not restrict flow of the lubricant along the fluid flow path in a first state, a second valve outlet (310, 410) that is operable to restrict flow of the lubricant along the fluid flow path in a second state, and a control that is operable to open the first valve outlet (308, 408) in the first state and open the second valve outlet (310, 414) in the second state.

19 Claims, 4 Drawing Sheets

TRANSFER CASE LUBRICATION SYSTEM WITH PUMP CONTROL

CROSS-REFERENCE TO RELATED APPLICATIONS

Not applicable.

BACKGROUND

In the field of vehicle drivetrain components, a transfer case is an apparatus that distributes driving power to more than one driven axle of the vehicle. A typical transfer case receives driving power from the transmission of the vehicle and transfers that power to a primary output shaft that is driven constantly, for example, during operation of the vehicle in a two-wheel drive mode, and a secondary output shaft that is driven selectively using a clutch, for example, during operation of the vehicle in a four-wheel drive mode. In addition, two-speed transfer cases provide gear reduction to allow operation in a high range, which is typically a 1:1 drive ratio, or a low range, such as a 2:1 drive ratio.

Many of the components in a transfer case, including the clutch, require lubrication. One transfer case design includes a pump that is mounted on either the input shaft or the primary output shaft. The pump delivers lubricant to the various components of the transfer case through an axial bore that is formed through the input shaft and/or the output shafts. Supply ports are formed through the input shaft and/or the output shafts at locations where lubrication is needed, such that the lubricant flows from the pump, through the axial bore, and out of the supply ports. This arrangement is effective, but offers little control over delivery of lubricant, for example, to the clutch that has variable lubrication needs depending on the mode and range of vehicle operation.

SUMMARY

One aspect of the disclosed embodiments is a lubrication system for a transfer case. The lubrication system includes a pump that is operable to supply a lubricant along a fluid flow path extending from a lubricant source to one or more components in a power transfer assembly. The pump includes a pump inlet in fluid communication with a lubricant source, a pump outlet in fluid communication with the one or more components in the power transfer assembly, and a valve positioned along the fluid flow path. The valve includes a valve inlet, a first valve outlet that does not restrict flow of the lubricant along the fluid flow path in a first state, a second valve outlet that is operable to restrict flow of the lubricant along the fluid flow path in a second state, and a control that is operable to open the first valve outlet in the first state and to open the second valve outlet in the second state.

Another aspect of the disclosed embodiments is a transfer case for a vehicle. The transfer case includes a power transfer assembly. The power transfer assembly includes an input shaft, a primary output shaft, a secondary output shaft, and a transfer clutch that is operable to transfer power from one of the input shaft and the primary output shaft to the secondary output shaft when the transfer clutch is in an engaged position. The transfer case also includes a lubrication system. The lubrication system includes a pump that is operable to supply a lubricant along a fluid flow path extending from a lubricant source to one or more components in the power transfer assembly. The power transfer assembly includes a pump inlet in fluid communication with a lubricant source, a pump outlet in fluid communication with the one or more components in the power transfer assembly, and one or more pumping elements. The rotational force from either the input shaft or the primary output shaft is transferred to the pumping elements to cause operation of the pump to supply the lubricant from the lubricant source to the power transfer assembly. The lubrication system also includes a valve positioned along the fluid flow path. The valve includes a valve inlet, a first valve outlet that does not restrict flow of the lubricant along the fluid flow path in a first state, a second valve outlet that is operable to restrict flow of the lubricant along the fluid flow path in a second state, and a control that is operable to open the first valve outlet in the first state and to open the second valve outlet in the second state.

BRIEF DESCRIPTION OF THE DRAWINGS

The description herein makes reference to the accompanying drawings, wherein like referenced numerals refer to like parts throughout several views, and wherein.

DETAILED DESCRIPTION

The disclosure herein is directed to a lubrication system for a transfer case in which the use of a valve control along the lubrication flow path between a sump, a pump, and various components of a power transfer assembly can reduce the parasitic losses associated with driving pumping elements to pressurize lubricant and reduce spin losses associated with shear forces generated by an oil film created between friction and separator plates of a clutch when the clutch is not engaged during a two-wheel drive mode of vehicle operation.

Figure 1:
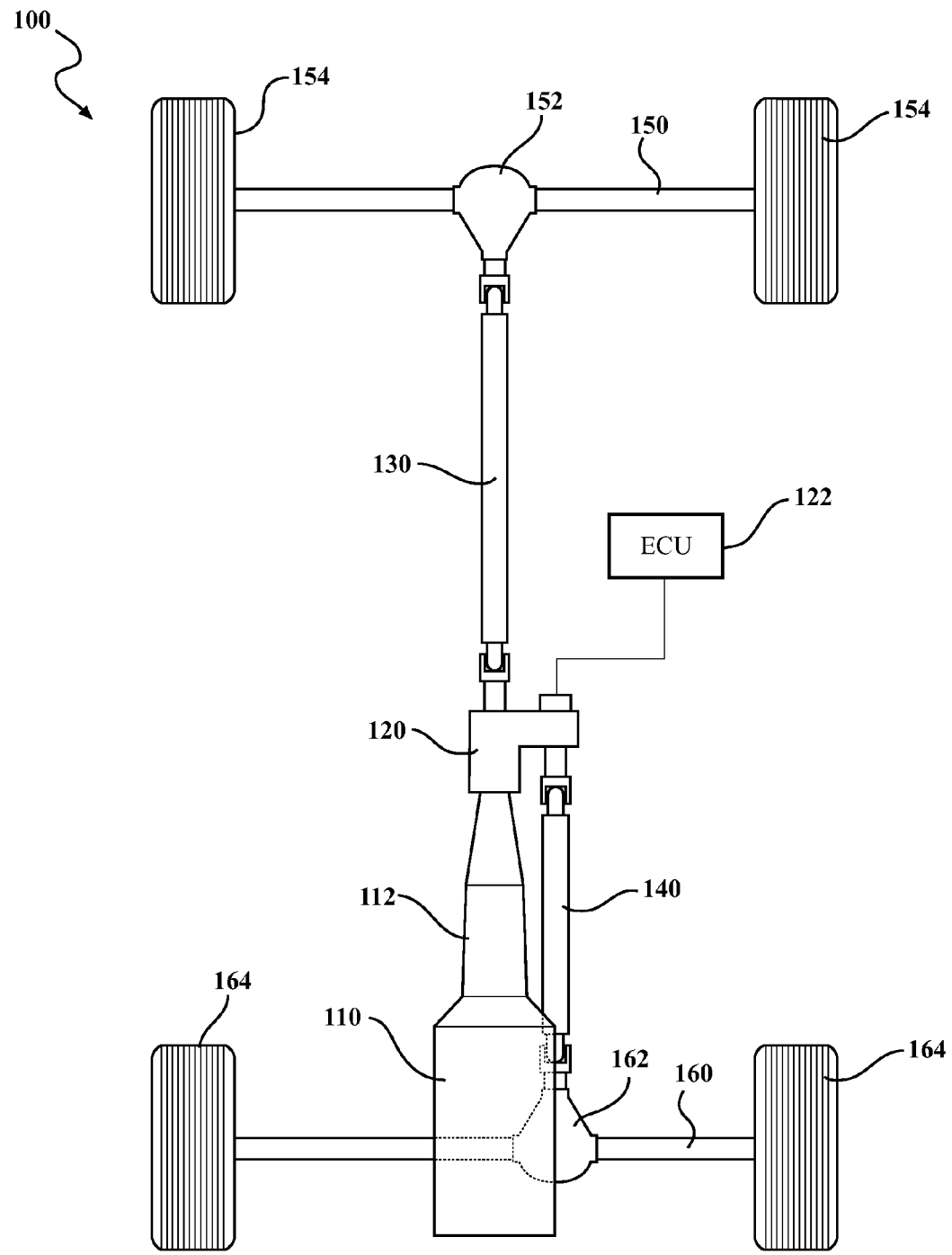
FIG. 1 is a plan view illustration showing a drivetrain that includes a transfer case.

FIG. 1 is a plan view illustration showing a drivetrain 100 for a four-wheel drive vehicle. The drivetrain 100 includes an engine 110 that is coupled to a transmission 112. The engine 110 is the prime mover of the drivetrain 100 and can be, for example, an internal combustion engine, an electric motor/generator, or a combination of the two. Other types of prime movers can be utilized as the engine 110 to provide driving power (e.g. via a rotating output shaft) to the transmission 112. The transmission 112 includes components operable to convert the speed and torque of the driving power provided by the engine 110, such as by a gear train that provides multiple gear ratios. As examples, the transmission 112 can be a manual transmission, an automatic transmission, a semi-automatic transmission, a continuously variable transmission, or a dual clutch transmission.

The transmission 112 provides driving power to a transfer case 120. The transfer case 120 is operable to distribute driving power to a rear driveshaft 130 and a front driveshaft 140. The transfer case 120 can, in some implementations, include components that allow the transfer case to perform a mode shift between two or more different modes. For example, the transfer case 120 can allow operation in a rear-wheel drive or two-wheel drive mode, in which only the rear driveshaft 130 receives driving power and the front driveshaft 140 does not, and a four-wheel drive mode, in which the rear driveshaft 130 and the front driveshaft 140 both receive driving power. In this example, the rear driveshaft 130 is the primary driveshaft and the front driveshaft 140 is the secondary driveshaft. In other implementations, the front driveshaft 140 is the primary driveshaft and the rear driveshaft 130 is the secondary driveshaft, and the transfer case 120 performs a mode shift between a front-wheel drive mode and a four-wheel drive mode. In other implementations, the transfer case 120 does not include components that allow a mode shift, and the transfer case 120 constantly provides driving power to both of the rear driveshaft 130 and the front driveshaft 140.

The transfer case 120 can allow a range shift that selectively provides gear reduction to the rotational output of the transfer case 120. For example, the transfer case can include components for operating in a high range, such as a 1:1 drive ratio, or a low range, such as a 2:1 drive ratio. The range shift changes the transfer case 120 between operation in the low range and the high range by selectively coupling and uncoupling a gear reduction mechanism of the transfer case 120.

Operation of the transfer case 120 can be regulated by a controller such as an ECU 122 that provides signals to components of the transfer case 120 to cause the mode shift and/or the range shift. In other implementations, the mode shift and/or the range shift can be actuated mechanically such as by a driver-operated lever that is mechanically connected to a component of the transfer case 120.

The rear driveshaft 130 provides driving power to a rear axle 150 via a rear differential 152. The rear axle 150 can be, for example, a solid axle or a pair of independent half axles. The rear axle 150 provides driving power to a pair of rear wheels 154 that are fitted with tires. The front driveshaft 140 provides driving power to a front axle 160 via a front differential 162. The front axle 160 can also be, for example, a solid axle or a pair of independent half axles. The front axle 160 provides driving power to a pair of front wheels 164 that are fitted with tires.

Figure 2:
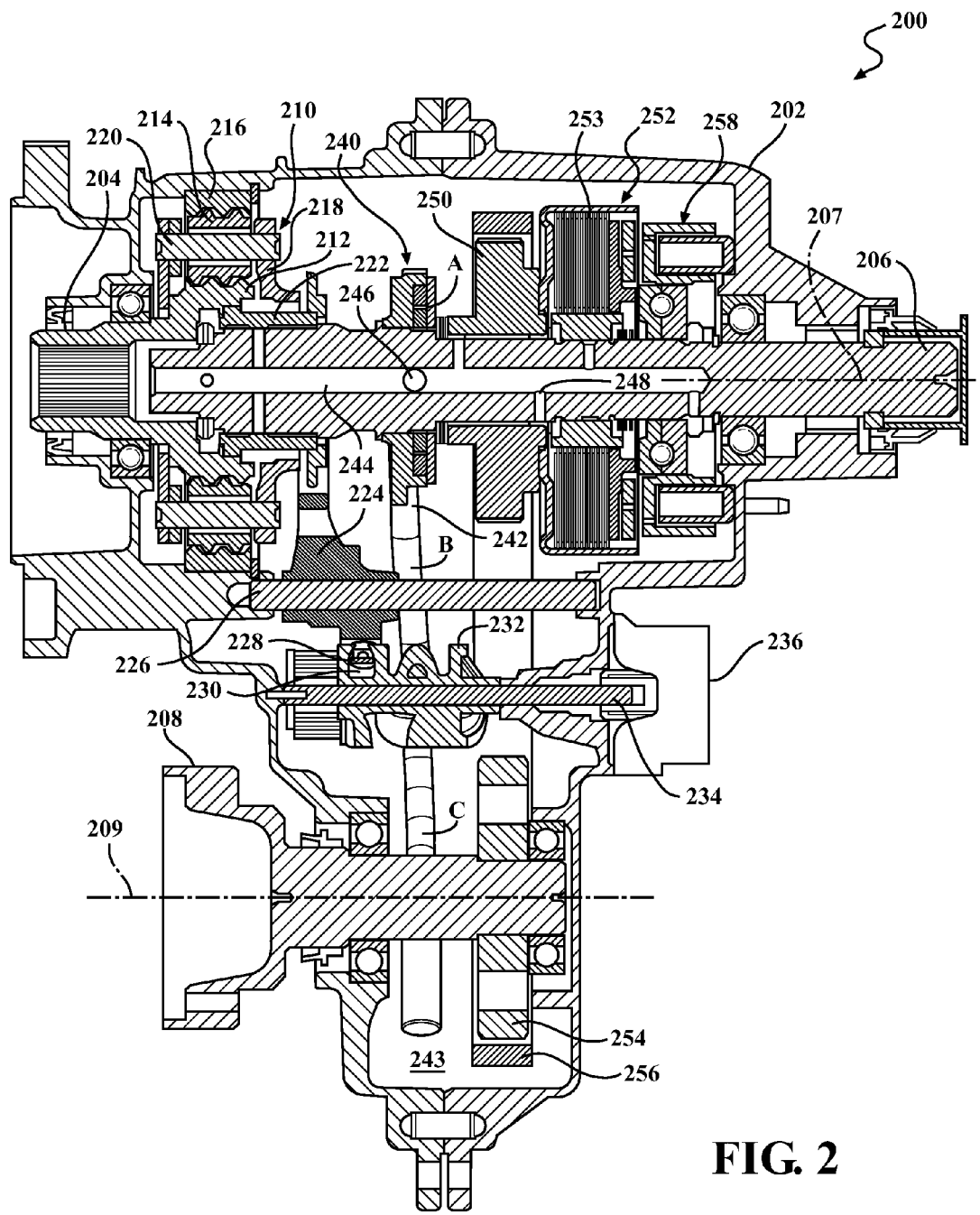
FIG. 2 is a cross-section illustration showing a transfer case that includes a lubrication system.

FIG. 2 is a cross-section illustration showing a conventional transfer case 200. The transfer case 200 includes a housing 202 and rotating components including an input shaft 204 that extends out of the housing 202, a primary output shaft 206 that extends out of the housing 202, and a secondary output shaft 208 that extends out of the housing 202. The input shaft 204 and the primary output shaft 206 extend along a first axis 207. The secondary output shaft 208 extends along a second axis 209 which is, in this example, parallel to the first axis 207. Together, the input shaft 204, the primary output shaft 206, and the secondary output shaft 208 form a power transfer assembly.

The input shaft 204 is at least partially hollow, and the primary output shaft 206 extends into the hollow interior of the input shaft 204. The input shaft 204 can be connected to the primary output shaft either directly or via a gear reduction mechanism 210. The gear reduction mechanism 210 can be a Ravigneaux planetary gearset that includes a sun gear 212 formed on the input shaft 204, a plurality of planet gears 214, and a ring gear 216 that is fixed to the housing 202. A planet carrier 218 is arranged on the input shaft 204 and can rotate about the input shaft 204. The planet gears 214 are arranged on stub shafts 220 that are connected to the planet carrier 218. The planet gears 214 mesh with the sun gear 212 and the ring gear 216.

A dog clutch 222 is utilized to engage and disengage the gear reduction mechanism 210. In a first position of the dog clutch 222, the dog clutch 222 engages the input shaft 204 and the primary output shaft 206 directly, which establishes a 1:1 drive ratio and does not utilize the gear reduction mechanism 210. In a second position of the dog clutch 222 (not shown), the dog clutch 222 is shifted axially away from the input shaft 204 and instead engages the planet carrier 218 and the primary output shaft 206. Driving power is thus routed through the gear reduction mechanism 210, with the planet carrier 218 rotating slower than the input shaft 204 to establish a drive ratio such as 2:1.

The dog clutch 222 is moved between its first and second positions by a first selector fork 224 which moves axially along a selector shaft 226. A first cam follower 228 is formed on the first selector fork 224. The first cam follower 228 is disposed in a first groove 230 formed on an exterior surface of a barrel cam 232. The barrel cam 232 is disposed on a rotatable shaft 234 that is rotated be an electric motor 236 in response to control signals from a controller such as the ECU 122 of FIG. 1.

The transfer case 200 includes a pump 240 for pumping a lubricant (not shown) to components of the transfer case 200 that require lubrication. In this example, the pump 240 is arranged on the primary output shaft 206 and pumping elements of the pump 240 are driven by the primary output shaft 206. The pump 240 can be, for example, a gerotor pump. Other types of pumping mechanisms can also be utilized. For example, the pump 240 does not need to be driven by the input shaft 204 or the primary output shaft 206 and can instead be located off the first axis 207 and designed to distribute lubricant to only certain areas of the transfer case 200, such as the sun gear 212, the planet gears 214, and the ring gear 216. Regardless of the position of the pump 240, at least a portion of the housing 202 can serve as a sump 243, that is, a lubricant source, and the pump 240 can include a conduit 242 that extends into the sump 243 of the housing 202.

To route lubricant to various components of the transfer case 200, the primary output shaft 206 includes an axially extending hollow bore 244 and a plurality of lubricant ports, each of which extends radially through the primary output shaft 206. The plurality of lubricant ports can include an inlet port 246 and one or more outlet ports 248. The inlet port 246 is aligned with an outlet of the pump 240 and receives the lubricant under pressure from the pump 240. The outlet ports 248 are positioned along the primary output shaft 206 near components that require lubrication. The lubricant is pressurized by the pump 240, travels through the inlet port 246, along the hollow bore 244, and out of one of the outlet ports 248 to lubricate various components in the transfer case 200. Excess lubricant then drains to the sump 243 inside the housing 202.

Some of the components in the transfer case 200 that require lubrication include a first sprocket 250 arranged on the primary output shaft 206 and connected to the primary output shaft 206 by a clutch 252. A second sprocket 254 is arranged on the secondary output shaft 208 and is connected for rotation in unison, such as by splines. The first sprocket 250 and the second sprocket 254 are connected by a chain 256, such that the secondary output shaft 208 is driven by the primary output shaft 206 via the first sprocket 250, the chain 256, and the second sprocket 254 when the clutch 252 is engaged. The clutch 252 includes, for example, a clutch pack 253 of interleaved plates, with the clutch 252 being engaged when pressure is applied to the clutch pack 253 by an actuator 258.

In the illustrated example, the clutch 252 can allow active control of distribution of power between the primary output shaft 206 and the secondary output shaft 208, the clutch 252, the sprockets 250, 254, and the chain 256 serving as additional components within the power transfer assembly. In alternative implementations, different types of clutches or other mechanisms can be used to control transfer of power from either the input shaft 204 or the primary output shaft 206 to the secondary output shaft 208. For example, the transfer case 200 could be configured to couple or decouple the first sprocket 250 with respect to the primary output shaft 206 as in well-known part-time/manual transfer cases. Other means for driving the secondary output shaft 208 are also possible.

Sufficient lubrication for the various moving components within the transfer case 200 is important when the vehicle operates in the four-wheel drive mode, that is, when the sprockets 250, 254, the clutch 252, the chain 256, and the secondary output shaft 208 are in motion in addition to the primary output shaft 206. However, a lesser amount of lubrication, or in some cases, intermittent lubrication, is needed when the vehicle operates in a two-wheel drive mode. Operating the pump 240 to produce the same level of lubrication during two-wheel drive mode operation as in four-wheel drive mode operation when the extra lubrication is not necessary can cause a reduction in fuel efficiency. Further, when the clutch 252 is disengaged in two-wheel drive mode, excessive lubrication can cause spin losses when shear forces are generated by a lubricant film formed between the interleaved plates of the clutch pack 253. Thus, a pump 240 configuration that accounts for differing lubrication needs based on the applicable mode of operation is described below.

Figure 3:
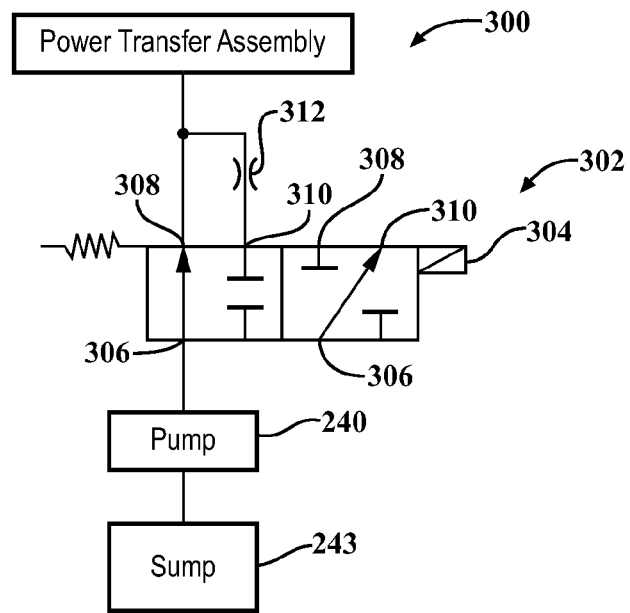
FIG. 3 is a hydraulic schematic showing one exemplary lubrication system.

FIG. 3 is a hydraulic schematic showing one exemplary lubrication system 300. The lubrication system 300 can be implemented, for example, in the transfer case 200 of FIG. 2 using the pump 240 or in any other transfer case of a suitable configuration. In the example associated with FIG. 2, the lubrication system 300 could be disposed on one of the input shaft 204 or the primary output shaft 206 of the transfer case 200. The lubrication system 300 can include the pump 240 as well as a pump housing (not shown) mounted within the transfer case 200 in a manner that restrains the pump housing from rotating in response to rotation of the input shaft 204 or the primary output shaft 206. For example, the pump housing can be fixed to the housing 202 of the transfer case 200.

The pump 240 can include one or more pumping elements (not shown) that are disposed in the pump housing and are operated by rotational force. The pump 240 can be a gerotor pump, and the one or more pumping elements can include an inner pump rotor that is located on the input shaft 204 or the primary output shaft 206 and an outer pump rotor that is an annular member that extends around the inner pump rotor. In conventional gerotor pumps, the inner pump rotor includes a first plurality of teeth and the outer pump rotor includes a second plurality of teeth in greater number than the first plurality of teeth. Typically, the outer pump rotor will include teeth in a number that is one greater than the number of teeth on the inner pump rotor.

Rotation of the inner pump rotor causes rotation of the outer pump rotor through meshing of their respective teeth, which creates a low pressure inlet region where the teeth diverge and a high pressure outlet region where the teeth converge. Referring back to FIG. 2, lubricant can be pressurized by the pump 240 and travel along a fluid flow path from the sump 243, through the conduit 242, through the inlet port 246, along the hollow bore 244, and out one or more of the outlet ports 248 to lubricate the relevant elements within the transfer case 200. The pumping elements of the pump 240 are not driven directly by the input shaft 204 or the primary output shaft 206. Instead, the inner pump rotor is disposed such that the relevant shaft 204, 206 may rotate independently of the rotation of the inner pump rotor.

The flow of lubricant can be metered to meet vehicle demand using a valve 302 disposed along the fluid flow path. Referring back to the illustrated example of FIG. 2, the valve 302 can be disposed along the conduit 242 between the pump 240 and the power transfer assembly, for example, at location A, before the inlet port 246 of the primary output shaft 206. Alternatively, the valve 302 can be disposed along the conduit 242 between the sump 243 and the pump 240 at various locations such as location B or location C. The valve 302 can include a control configured to switch between two states that alter the fluid flow path. In the example shown in FIG. 3, the control is a solenoid 304 that can receive electricity from an external power source (not shown) to switch between being energized (e.g., a first state) and de-energized (e.g., a second state).

In operation, a determination is made as to whether to restrict the flow of lubricant through the lubrication system 300. The determination can be made by a controller such as the ECU 122 of the drivetrain 100 based on, for example, operating conditions of the drivetrain 100. If restriction of the flow of lubricant is not desired, for example, during four-wheel drive operation of the vehicle, the solenoid 304 can be de-energized, and the lubricant can flow freely from a valve inlet 306 to a first valve outlet 308. In this example, the lubricant can be supplied from the pump 240 to the various components of the power transfer assembly as if no valve 302 were present along the fluid flow path.

However, if the flow of lubricant is to be restricted, for example, during two-wheel drive operation of the vehicle, the solenoid 304 within the valve 302 can be energized, and the valve 302 can direct the flow of lubricant from the valve inlet 306 to a second valve outlet 310. The lubricant can encounter a restriction 312 along the fluid flow path after exiting the second valve outlet 310. This restriction 312 can slow or meter the flow of lubricant to reduce the amount of lubricant that is delivered to the various components of the power transfer assembly. This is advantageous in two-wheel drive mode since the clutch 252 is disengaged and the demand for lubricant at the clutch 252, the secondary output shaft 208, the sprockets 250, 254, and the chain 256 is greatly reduced.

The valve 302 can also be used as a metering mechanism, that is, the flow of lubricant can be metered by energizing and de-energizing the solenoid 304 using a predetermined pattern to switch the flow path between the first valve outlet 308 and the second valve outlet 310. In another example, the restriction 312 can be variable, that is, the restriction 312 can be controlled to variably meter the flow of lubricant along the fluid flow path when lubricant exits the second valve outlet 310. The function of the solenoid 304 can also be reversed, that is, the valve 302 can be designed to allow free flow of lubricant when the solenoid 304 in the energized state.

Figure 4:
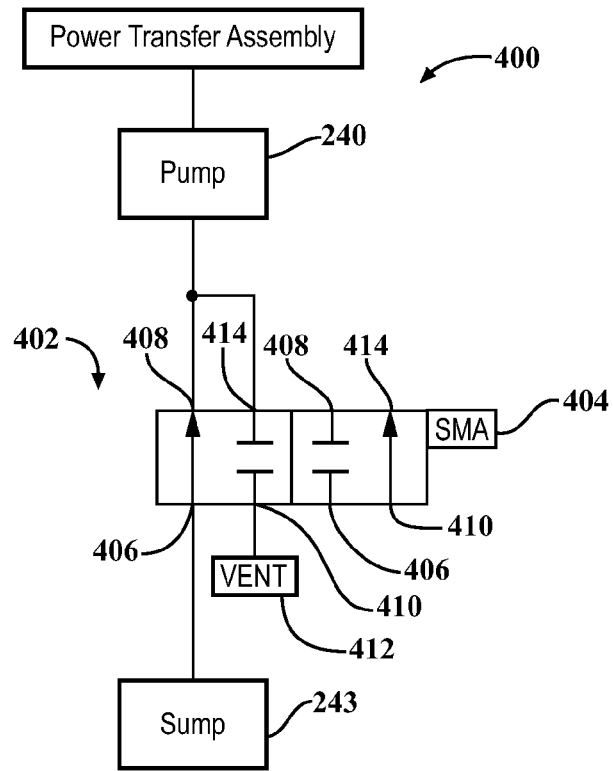
FIG. 4 is a hydraulic schematic showing another exemplary lubrication system.

FIG. 4 is a hydraulic schematic showing another exemplary lubrication system 400. The lubrication system 400 can also be implemented, for example, in the transfer case 200 of FIG. 2 using the pump 240 or in any other transfer case of a suitable configuration. The flow of lubricant can be metered to meet vehicle demand using a valve 402 disposed along the fluid flow path. In the illustrated example, the valve 402 is disposed along the conduit 242 between the sump 243 and the pump 240.

The valve 402 can include a control configured to switch between two states that alter the fluid flow path. In the example shown in FIG. 4, the control includes smart material 404, that is, any material which can be caused to expand or contract through the application of heat, electric voltage, magnetic fields, etc. Some examples of the smart material 404 include piezoelectric composites, electro-active polymers, shape memory alloys, and carbon nanotube composites. The smart material 404 can be actuated and de-actuated in order to switch between a first state and a second state. Though smart material 404 is shown, it is also possible to use a solenoid, or other control mechanism to switch between the two states of the valve 402.

In operation, a determination is made as to whether to restrict the flow of lubricant through the lubrication system 400. If restriction of the flow of lubricant is not desired, for example, during four-wheel drive operation of the vehicle, the smart material 404 can be de-actuated, and the lubricant can flow freely from a first valve inlet 406 to a first valve outlet 408. In this example, the lubricant can be supplied to pump 240 from the sump 243 as if no valve 402 were present along the fluid flow path.

However, if the flow of lubricant is to be restricted, for example, during two-wheel drive operation of the vehicle, the smart material 404 within the valve 402 can be actuated, and the valve 402 can block the flow of lubricant from the first valve inlet 406 to the first valve outlet 408. This change to the fluid flow path stops lubricant from reaching the pump 240 and the components in the power transfer assembly. At the same time, a second valve inlet 410 is opened to a vent 412 that can direct airflow at atmospheric pressure from the second valve inlet 410 to a second valve outlet 414 that is also in fluid communication with the pump 240. By opening the vent 412, pump 240 is configured to draw air instead of lubricant, and the pumping components can spin more freely without the burden of drawing lubricant along the fluid flow path. The function of the smart material 404 can also be reversed, that is, the valve 402 can be designed to allow free flow of lubricant when the smart material 404 is actuated.

Figure 5:
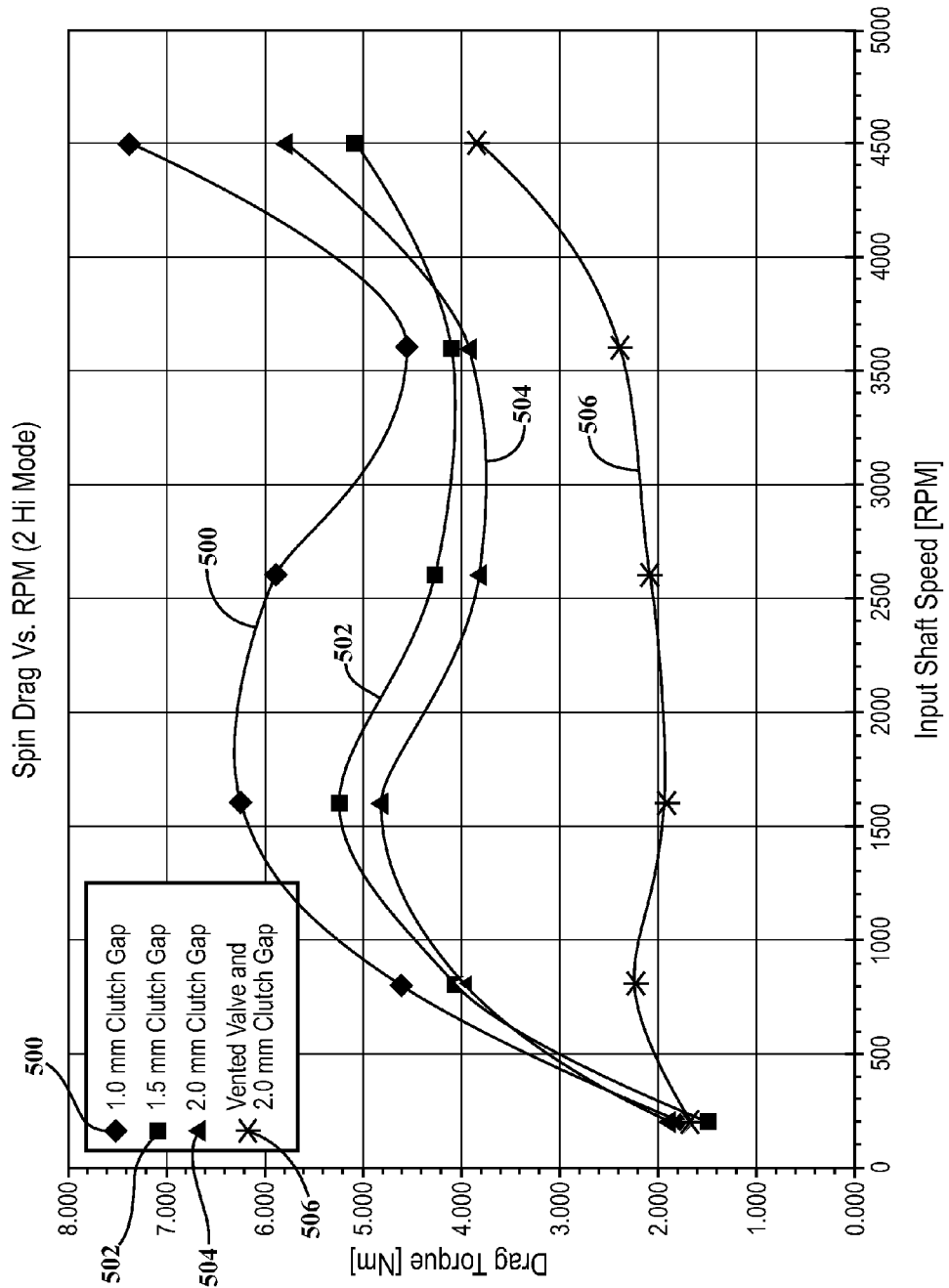
FIG. 5 is graph showing drag torque versus input shaft speed curves based on clutch gap and use of the exemplary lubrication system of FIG. 4.

FIG. 5 is graph showing drag torque versus input shaft 204 speed curves based on clutch gap and use of the exemplary lubrication system 400 of FIG. 4. The clutch gap can be measured between friction and separator plates within the clutch pack 253 when the clutch 252 is not engaged. The clutch gap can be designed to optimize engagement speed for the clutch 252 while at the same time reducing shear forces between friction and separator plates when the clutch 252 is disengaged, but these design drivers have opposite impacts on the clutch gap. In a first curve 500, a small clutch gap of 1.0 mm is represented, with the drag torque caused by lubricant being supplied to the clutch 252 during a two-wheel drive mode of operation (here, 2-hi mode) being at the highest level of spin loss or drag experienced. The curve 500 is considered the spin loss and drag baseline.

In a second curve 502 and a third curve 504, the clutch gap is successively increased to 1.5 mm and 2.0 mm, and though spin losses and drag are reduced, there are diminishing returns between the curves 502, 504. Any further increase in the clutch gap could negatively slow the response of engagement for the clutch 252 as well. The use of the valve 402 represented in FIG. 4 is shown by a curve 506. In the curve 506, the valve 402 is blocking lubricant from the first valve inlet 406 to the first valve outlet 408. The valve 402 is also vented, allowing atmospheric pressure from a vent 412 to route from the second valve inlet 410 to the second valve outlet 414, effectively breaking suction available to the pump 240 and reducing spin losses at the pump 240 since no lubricant is pulled through the pump 240 given the break in suction. As shown by the curve 506, the use of the valve 402 to effectively eliminate the flow of lubricant to the power transfer assembly during two-wheel drive mode operation greatly reduces the drag losses over the reduction possible using an increase in clutch gap alone.

The increased power available to the driveline by moving from the curve 504 to the curve 506 can be calculated using the difference in drag torque between the two curves 504, 506 at a specific input speed: (change in drag torque)*2π*(input speed)/60. The increase in available power thus increases with higher input shaft speeds, with approximately 900 Watts of additional power available at an input shaft speed of 4,500 RPM.

While the disclosure has been made in connection with what is presently considered to be the most practical and preferred embodiment, it should be understood that the disclosure is intended to cover various modifications and equivalent arrangements.

The invention claimed is:

1. A lubrication system (300, 400) for a transfer case (200), comprising:
a pump (240) that is operable to supply a lubricant along a fluid flow path extending from a lubricant source (243) to one or more components in a power transfer assembly, comprising:
a pump inlet in fluid communication with a lubricant source (243);
a pump outlet in fluid communication with the one or more components in the power transfer assembly; and
a valve (302, 402) disposed along a conduit (242) extending between the lubricant source (243) and the pump inlet, the valve (302, 402) including:
a valve inlet (306, 406) in fluid communication with the lubricant source (243);
a first valve outlet (308, 408) that does not restrict flow of the lubricant along the fluid flow path in a first state;
a second valve outlet (310, 414) that is operable to restrict flow of the lubricant along the fluid flow path in a second state; and
a control that is operable to open the first valve outlet (308, 408) in the first state and to open the second valve outlet (310, 414) in the second state.

2. The lubrication system (300) of claim 1, wherein the second valve outlet (310) is in fluid communication with a restriction (312) disposed along the conduit (242) extending between the lubricant source (243) and the one or more components in the power transfer assembly.

3. The lubrication system (400) of claim 1, wherein the second valve outlet (414) is in fluid communication with a vent (412).

4. The lubrication system (300) of claim 1, wherein the control includes a solenoid (304).

5. The lubrication system (300) of claim 4, wherein the solenoid (304) is energized in the first state and de-energized in the second state.

6. The lubrication system (300) of claim 4, wherein the solenoid (304) is de-energized in the first state and energized in the second state.

7. The lubrication system (400) of claim 1, wherein the control includes smart material (404).

8. The lubrication system (400) of claim 7, wherein the smart material (404) is actuated in the first state and de-actuated in the second state.

9. The lubrication system (400) of claim 7, wherein the smart material (404) is de-actuated in the first state and actuated in the second state.

10. The lubrication system (400) of claim 1, wherein the valve inlet (406) is a first valve inlet, the valve (402) further comprising:
   a second valve inlet (410) in fluid communication with a vent (412).

11. The lubrication system (400) of claim 10, wherein the control is operable to direct airflow at atmospheric pressure from the second valve inlet (410) to the second valve outlet (414) in the second state.

12. The lubrication system (300, 400) of claim 1, wherein the pump (240) is a gerotor pump.

13. A transfer case (200) for a vehicle, comprising:
   a power transfer assembly, comprising:
      an input shaft (204);
      a primary output shaft (206);
      a secondary output shaft (208); and
      a transfer clutch (252) that is operable to transfer power from one of the input shaft (204) and the primary output shaft (206) to the secondary output shaft (208) when the transfer clutch (252) is in an engaged position;
   a lubrication system (300, 400), including:
   a pump (240) that is operable to supply a lubricant along a fluid flow path extending from a lubricant source (243) to one or more components in the power transfer assembly, comprising:
      a pump inlet in fluid communication with a lubricant source (243);
      a pump outlet in fluid communication with the one or more components in the power transfer assembly; and
      one or more pumping elements, wherein rotational force from one of the input shaft (204) and the primary output shaft (206) is transferred to the one or more pumping elements to cause operation of the pump (240) to supply the lubricant from the lubricant source (243) to the power transfer assembly; and
   a valve (302, 402) positioned along the fluid flow path, the valve (302, 402) including:
   a valve inlet (306, 406);
   a first valve outlet (308, 408) that does not restrict flow of the lubricant along the fluid flow path in a first state;
   a second valve outlet (310, 414) that is operable to restrict flow of the lubricant along the fluid flow path in a second state; and
   a control that is operable to open the first valve outlet (308, 408) in the first state and to open the second valve outlet (310, 414) in the second state.

14. A lubrication system (300, 400) for a transfer case (200), comprising:
   a pump (240) that is operable to supply a lubricant along a fluid flow path extending from a lubricant source (243) to one or more components in a power transfer assembly, comprising:
      a pump inlet in fluid communication with a lubricant source (243);
      a pump outlet in fluid communication with the one or more components in the power transfer assembly; and
   a valve (302, 402) positioned along the fluid flow path, the valve (302, 402) including:
      a first valve inlet (306, 406) in fluid communication with the lubricant source (243);
      a second valve inlet (410) in fluid communication with a vent (412);
      a first valve outlet (308, 408) that does not restrict flow of the lubricant along the fluid flow path in a first state;
      a second valve outlet (310, 414) that is operable to restrict flow of the lubricant along the fluid flow path in a second state; and
      a control that is operable to open the first valve outlet (308, 408) in the first state and to open the second valve outlet (310, 414) in the second state.

15. The lubrication system (300, 400) of claim 14, wherein the valve (302, 402) is disposed along a conduit (242) extending between the lubricant source (243) and the pump inlet.

16. The lubrication system (300, 400) of claim 14, wherein the valve (302, 402) is disposed along a conduit (242) extending between the pump outlet and the one or more components in the power transfer assembly and the first valve inlet (306, 406) is in fluid communication with the pump outlet.

17. The lubrication system (400) of claim 14, wherein the control is operable to direct airflow at atmospheric pressure from the second valve inlet (410) to the second valve outlet (414) in the second state.

18. The lubrication system (300, 400) of claim 14, wherein the control comprises one of a solenoid (304) and a smart material (404).

19. The lubrication system (300, 400) of claim 14, wherein the pump (240) is a gerotor pump.

* * * * *